Feb. 20, 1945. H. B. BROSE 2,370,004
AUTOMATIC SLIDE PROJECTOR
Filed Oct. 6, 1943
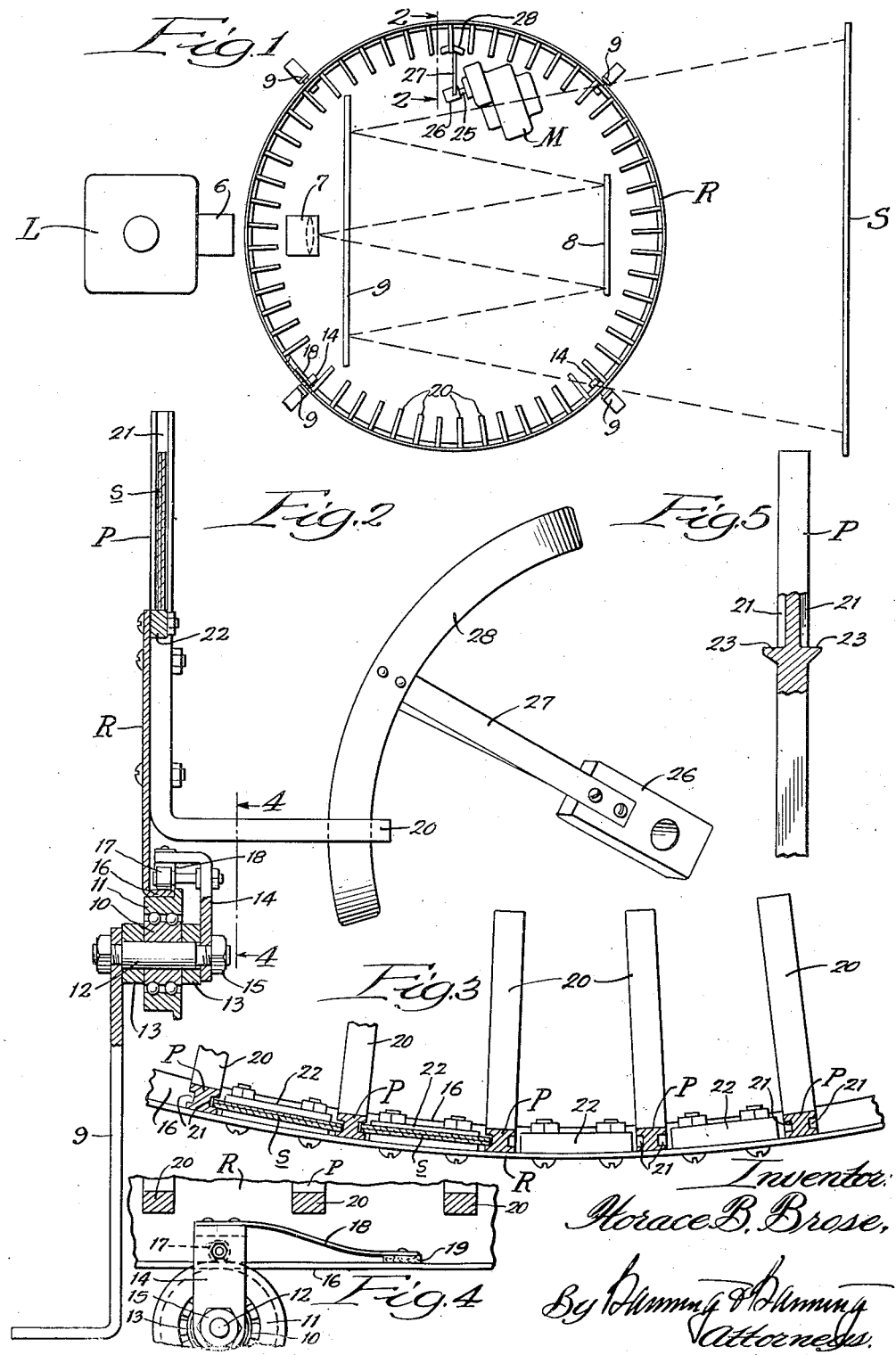

Patented Feb. 20, 1945

2,370,004

UNITED STATES PATENT OFFICE 2,370,004

AUTOMATIC SLIDE PROJECTOR

Horace B. Brose, Chicago, Ill.

Application October 6, 1943, Serial No. 505,133

2 Claims. (Cl. 88—27)

The present invention which relates generally to automatic slide projectors is concerned particularly with means by which a plurality of slides are successively advanced in timed relation in the path of light rays which transmit images from the slides to a screen for display thereon. Such a projector may be used to advantage for display or instruction purposes in public places, store windows, and elsewhere.

It is a primary object of my invention to devise means for supporting a plurality of slides in a circular mounting rotatable upon a plurality of rollers and adapted to be driven intermittently by a constantly operating motor having for this purpose a simple and effective transmission which initiates movement in a gradual and easy manner. My invention is concerned also with a friction brake by which the circular mounting is restrained from overrunning when advanced the distance of a single slide. These and other features, which will more clearly hereinafter appear from the specification and claims, are set forth in the accompanying drawing wherein—

Figure 1 is a diagrammatic plan view of the mechanism in its entirety;

Fig. 2 is an enlarged detail in vertical section, taken on line 2—2 of Fig. 1;

Fig. 3 is a fragmentary view in plan, showing a plurality of slides in place within the circular mounting from which a plurality of radial fingers are extended inwardly;

Fig. 4 is a detail in section, taken on line 4—4 of Fig. 2; and

Fig. 5 is a fragmentary elevational view, partly broken away to show in section one of the slide mounting posts of modified construction.

According to the showing in Fig. 1, I may employ a light source L from which rays pass through lens systems 6 and 7 on to a mirror 8, thence back to a second mirror 9 from whence the projected images are cast on to a screen S. Such a light system is arranged in part within and in part without a rotatable circular ring R forming a carrier for the slides, as will now be explained.

Upon a suitable base (not shown) is mounted a plurality of brackets 9 each supporting a fixed hub 10 having a ball raceway about which may rotate a free running flanged wheel 11. As shown, each hub is secured to its supporting bracket by a bolt 12 which may traverse a pair of spacer blocks 13, one bearing against the bracket; in the case of at least one bracket one block 13 bears against a vertical arm 14 which is clamped fixedly upon the bolt as by means of a nut 15. Supported and guided upon the several wheels 11 is a flange 16 extended inwardly from the carrier ring R. Near its upper end the arm 14 supports a rotatable roller 17 adapted to ride upon the upper face of the carrier flange 16, and thereover is bent to extend laterally toward the carrier ring to mount a leaf spring 18 having a shoe 19 which frictionally bears upon the flange. The shoe which remains in tension engagement with the flange 16 serves as a friction brake to prevent overrunning of the carrier ring immediately following cessation of the motion transmitting force that is applied thereto in the manner shortly to be explained.

Upon the slide carrier ring I mount, at equal distances apart, preferably upon the inner face thereof, a plurality of vertical posts P each bent to provide at its lower end a laterally turned finger 20 which is extended inwardly in a substantially radial direction. Each post which is extended upwardly beyond the top of the carrier ring is oppositely channeled at 21 throughout the region of such extension to provide with the channels of the adjacent posts facing grooves within which may be freely received the opposite edges of slides s which are insertible or removable from the top. As a bottom support for the slides I may employ short horizontal bars 22, one between each two posts, and each affixed to the inner face of the carrier ring at an elevation close to the top edge thereof; or, in lieu of such bars, I may terminate the channels 21 adjacent supporting shoulders 23 (see Fig. 5) formed on the posts at elevations about opposite the top edge of the carrier ring.

Within the space interiorly of the carrier ring R is a motor M whose housing encloses also a reduction gear driving a shaft 25 whereon is affixed a block 26 supporting one end of an arm 27 in connection with an arcuate cam 28 extending through perhaps 90°. The ends of the acting cam face are desirably beveled or tapered off, as shown. The motor is so positioned as to swing the cam through a circular path in a substantially vertical plane which intersects the horizontal circular path through which the bar fingers 20 are revolved when the carrier ring is rotated about its fixed axis, whereby the cam is required, with each rotation of the shaft, to advance through one of the spaces intervening between two adjacent fingers for successive wiping engagement therewith. The obliquity of the axis of the driving shaft in relation to each finger, during engagement thereof, plus the pitch of the arcuate cam lengthwise of the shaft axis, is such as to advance the trailing end of the cam to a forward position through a distance substantially equal to the spacing between two adjacent fingers while maintaining engagement with one of them. In each cycle of movement the acting cam face, starting at one end and continuing through to the other end, wipes across one of the fingers during a period of one-fourth the total (assuming the cam length to be 90°); for the remaining three-fourths period the cam remains continuously in motion but free of engagement with any finger. It is only during the period of engagement that the carrier ring undergoes rotary movement in response to the force transmitted to one of its fingers by the cam. When this engagement ceases, the friction brake which exerts a constant tension force on the flange 16 acts instantly to prevent any undue over-running of the ring.

The transmission herein described is exceedingly simple and positive in its operation. Because of the many possible variations and contours in cam pitch, the ring movement can be accurately controlled. Such a cam drive makes it possible to initiate movement of the ring easily, gradually and without noticeable impact. The periods of advance and of pause may be varied by changes in the cam length, so that an image projected from the slide which is exposed to the light rays in the lens system will remain stationary or be in motion through time intervals related as desired. To coact with the cam drive I employ fingers extending radially from the slide supporting posts, the ring serving as a common carrier therefor. By such an arrangement I reduce to a minimum the number of parts, thereby holding down the weight and the cost as well.

The mechanism in its entirety, except perhaps only the light source, may be accommodated within a small cabinet or upon the walls thereof, this being possible because of the compact arrangement of the various operating units.

I claim:

1. An automatic slide projector in which is comprised a circular carrier mounting a plurality of slides, a wheeled support whereon the circular carrier is mounted to rotate about a fixed axis, a power source and a transmission leading therefrom wholly disposed within the confines of the slide carrier including a plurality of equally spaced means extending inwardly radially from the carrier, and an arcuate pitched cam successively rotatable between each pair of adjacent spaced radial means for engagement with one of them and movable about a fixed axis through a path non-radial with respect to the carrier and disposed in all positions obliquely to the radial means when the latter is positioned for engagement by the cam whereby to advance the cam through a circular path obliquely inclined to the engaged radial means, the sum of the oblique angle and cam pitch being sufficient to cause a rotation of the carrier through a distance substantially equal to the spacing between two adjacent spaced radial means.

2. An automatic slide projector in which is comprised a circular slide carrier, a wheeled support wherein the carrier is mounted to rotate about a fixed axis, a power source and a transmission leading therefrom wholly disposed within the confines of the slide carrier including a cam rotatable about a fixed axis through a movement path that is misaligned with respect to the carrier axis, and a plurality of slide supports vertically mounted on the carrier at equal distances apart and each turned laterally at its bottom to extend inwardly radially of the carrier for advance through a movement path in intersection with that of the cam whereby the latter is caused to engage successively with each of the radially extending means to advance the carrier rotatively a predetermined distance.

HORACE B. BROSE.